(12) United States Patent
Bala et al.

(10) Patent No.: US 12,279,284 B2
(45) Date of Patent: Apr. 15, 2025

(54) METHODS, APPARATUS, AND SYSTEMS FOR REDUCED BANDWIDTH FOR REDUCED CAPABILITY WTRUS

(71) Applicant: InterDigital Patent Holdings, Inc., Wilmington, DE (US)

(72) Inventors: Erdem Bala, East Meadow, NY (US); Moon Il Lee, Melville, NY (US); Janet Stern-Berkowitz, Little Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/680,712

(22) Filed: May 31, 2024

(65) Prior Publication Data

US 2024/0323981 A1 Sep. 26, 2024

Related U.S. Application Data

(63) Continuation of application No. 18/270,658, filed as application No. PCT/US2022/012143 on Jan. 12, 2022.

(Continued)

(51) Int. Cl.
*H04W 72/30* (2023.01)
*H04W 72/0457* (2023.01)
*H04W 72/232* (2023.01)

(52) U.S. Cl.
CPC ....... *H04W 72/30* (2023.01); *H04W 72/0457* (2023.01); *H04W 72/232* (2023.01)

(58) Field of Classification Search
CPC .......... H04W 72/30; H04W 72/0457; H04W 72/232

(Continued)

(56) References Cited

U.S. PATENT DOCUMENTS

2020/0162981 A1* 5/2020 Jain ..................... H04W 36/302
2020/0228966 A1* 7/2020 Xu ........................ H04W 72/23

(Continued)

FOREIGN PATENT DOCUMENTS

CN 110475361 A 11/2019
EP 3826407 A1 5/2021

(Continued)

OTHER PUBLICATIONS

Third Generation Partnership Project (3GPP), Technical Specification Group Radio Access Network; NR; "Physical Channels and Modulation", Release 16, 3GPP TS 38.211 V16.4.0, Dec. 2020, Valbonne, France, 133 pages.

(Continued)

*Primary Examiner* — Chi Tang P Cheng
(74) *Attorney, Agent, or Firm* — Flaster Greenberg, P.C.

(57) ABSTRACT

Methods, apparatus, systems, architectures and interfaces for receiving system information performed by a wireless transmit receive unit (WTRU) having reduced capacity, are provided. A method may include any of: receiving a physical broadcast channel (PBCH) transmission of a cell, the PBCH transmission including information, wherein the information indicates a first control resource set (CORESET) associated with reception of a system information block (SIB); receiving, via the first CORESET, a first physical downlink control channel (PDCCH) transmission including information indicating a first type SIB associated with the first PDCCH transmission, wherein the information indicating the first type SIB includes information indicating a second CORESET that (1) is associated with reception of a second type SIB, and (2) has fewer resource blocks than the first CORESET; and receiving, via the second CORESET, a second PDCCH transmission including information indicating the (Continued)

second type SIB associated with the second PDCCH transmission.

18 Claims, 12 Drawing Sheets

Related U.S. Application Data

(60) Provisional application No. 63/136,402, filed on Jan. 12, 2021.

(58) Field of Classification Search
USPC .......................................................... 370/329
See application file for complete search history.

(56) References Cited

U.S. PATENT DOCUMENTS

| | | |
|---|---|---|
| 2021/0289536 A1 | 9/2021 | Liu et al. |
| 2022/0321290 A1 | 10/2022 | Liu |
| 2022/0330242 A1* | 10/2022 | Zhou ..................... H04L 5/0044 |

FOREIGN PATENT DOCUMENTS

| | | |
|---|---|---|
| WO | WO 2020/017434 A1 | 1/2020 |
| WO | WO 2020/258335 A1 | 12/2020 |
| WO | WO 2021/190510 A1 | 9/2021 |

OTHER PUBLICATIONS

Third Generation Partnership Project (3GPP), Technical Specification Group Radio Access Network; NR; "Multiplexing and Channel Coding", Release 16, 3GPP TS 38.212 V16.4.0, Dec. 2020, Valbonne, France, 152 pages.
Third Generation Partnership Project (3GPP), Technical Specification Group Radio Access Network; NR; "Physical Layer Procedures for Control", Release 16, 3GPP TS 38.213 V16.4.0, Dec. 2020, Valbonne, France, 181 pages.
Third Generation Partnership Project (3GPP), Technical Specification Group Radio Access Network; NR; "Physical Layer Procedures for Data", Release 16, 3GPP TS 38.214 V16.4.0, Dec. 2020, Valbonne, France, 169 pages.
Third Generation Partnership Project (3GPP), Technical Specification Group Radio Access Network; NR; "User Equipment (UE) Procedures in Idle Mode and RRC Inactive State", Release 16, 3GPP TS 38.304 V16.3.0, Dec. 2020, Valbonne, France, 39 pages.
Third Generation Partnership Project (3GPP), Technical Specification Group Radio Access Network; NR; "Medium Access Control (MAC) Protocol Specification", Release 16, 3GPP TS 38.321 V16.3.0, Dec. 2020, Valbonne, France, 156 pages.
Third Generation Partnership Project (3GPP), Technical Specification Group Radio Access Network; NR; "Radio Resource Control (RRC) Protocol Specification", Release 16, 3GPP TS 38.331 V16.3.1, Jan. 2021, Valbonne, France, 932 pages.
Third Generation Partnership Project (3GPP), 3GPP TS 38.213 V15.12.0 , "Physical layer procedures for control", 3rd Generation Partnership Project; Technical Specification Group Radio Access Network; NR;, Dec. 2020, 110 pages.
Third Generation Partnership Project (3GPP), R1-2006687 , "Access restriction for reduced capability NR devices", 3GPP TSG RAN WG1 #102, Aug. 17-Aug. 28, 2020, 3 pages.
Third Generation Partnership Project (3GPP), R1-2008264 , "Other considerations for reduced UE capability", 3GPP TSG RAN WG1 #103, Oct. 26-Nov. 13, 2020, 2 pages.
Third Generation Partnership Project (3GPP), R1-2009608 , "Moderator summary #3 on RedCap—Others", 3GPP TSG RAN WG1 Meeting #103 Moderator (Intel Corporation), Oct. 26-Nov. 13, 2020, 46 pages.

* cited by examiner

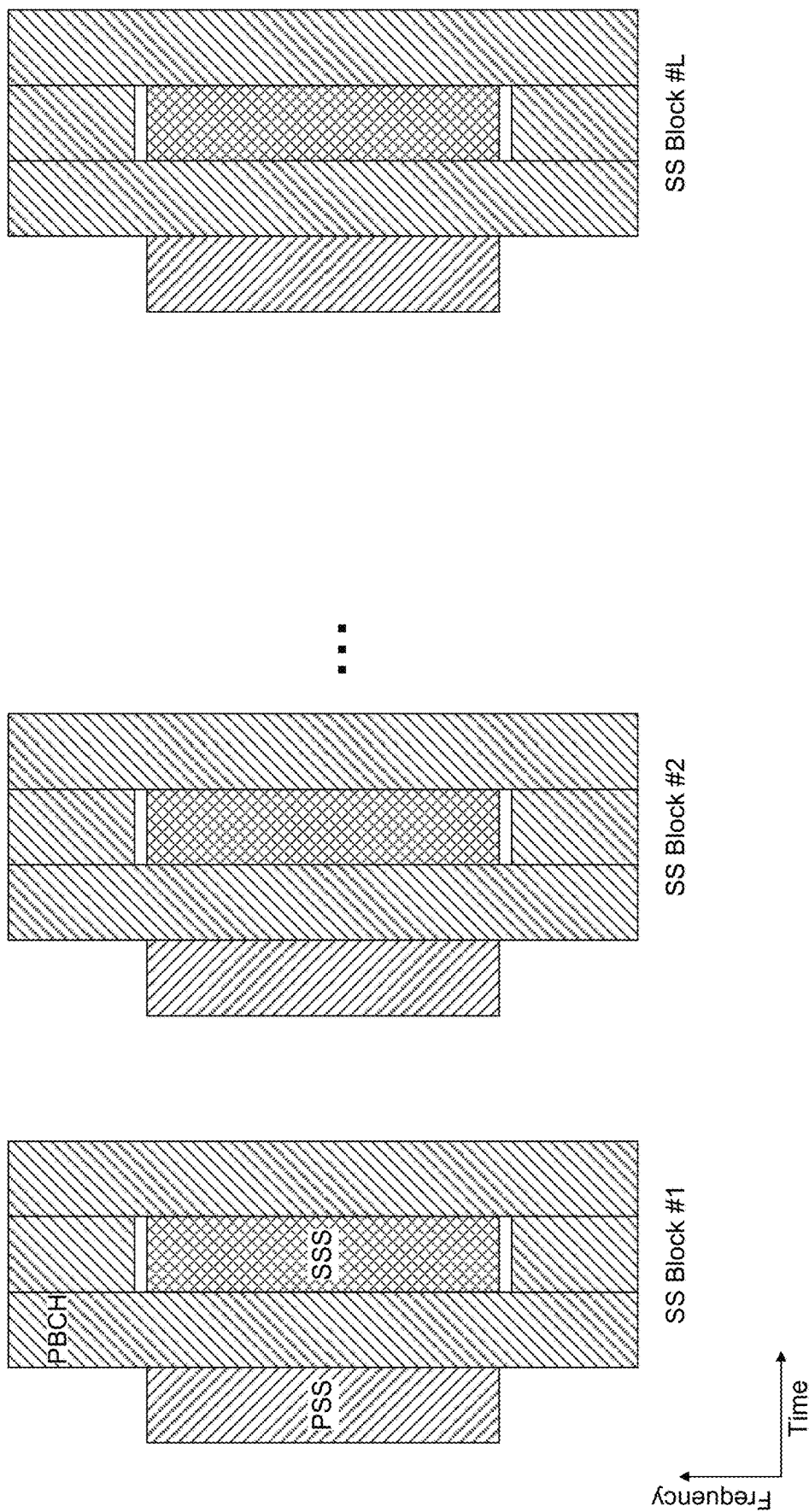
Figure 2 SS/PBCH Block Structure

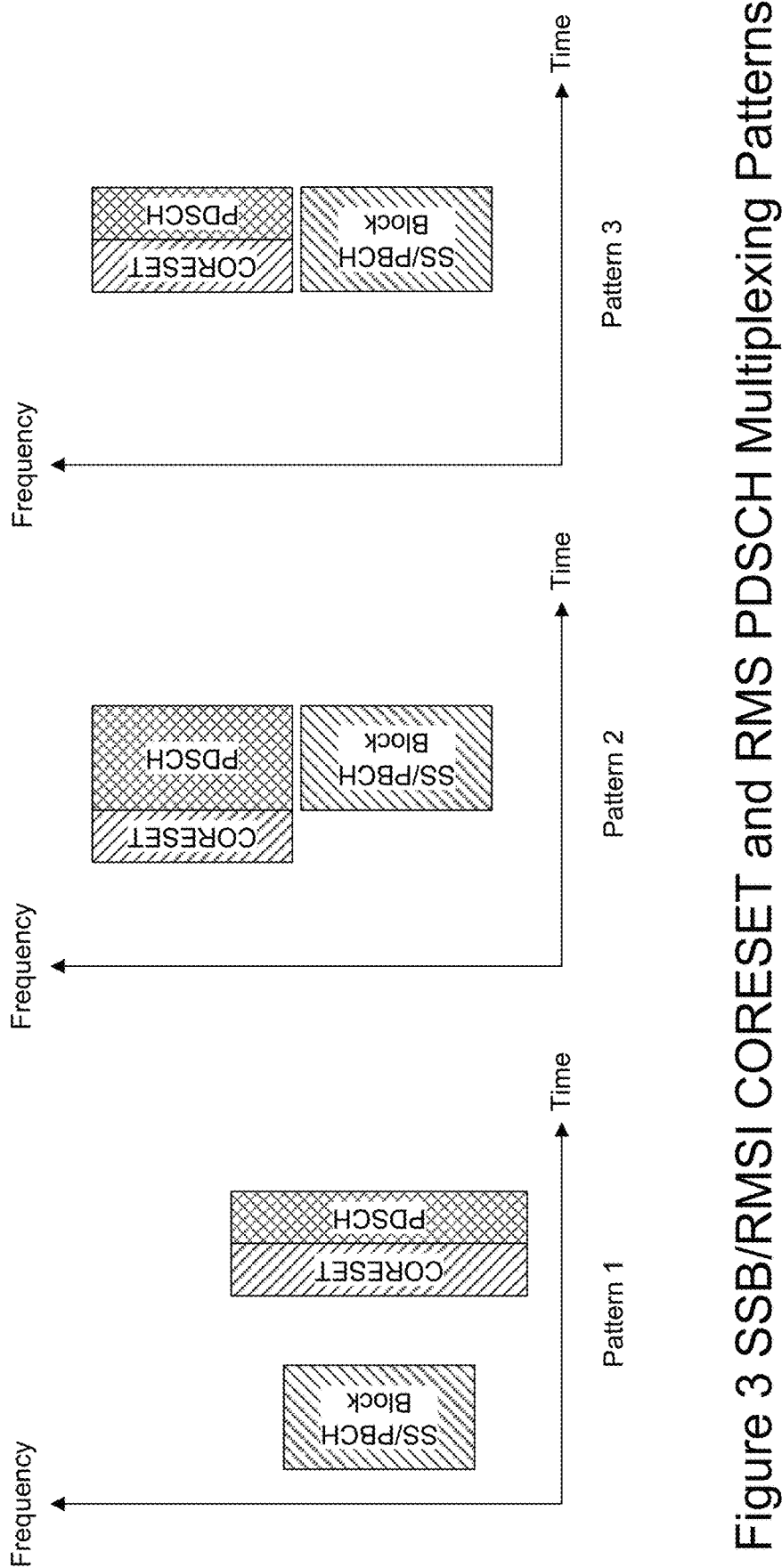
Figure 3 SSB/RMSI CORESET and RMS PDSCH Multiplexing Patterns

Figure 4 Pattern 2 Example

Figure 5 Pattern 3 Example

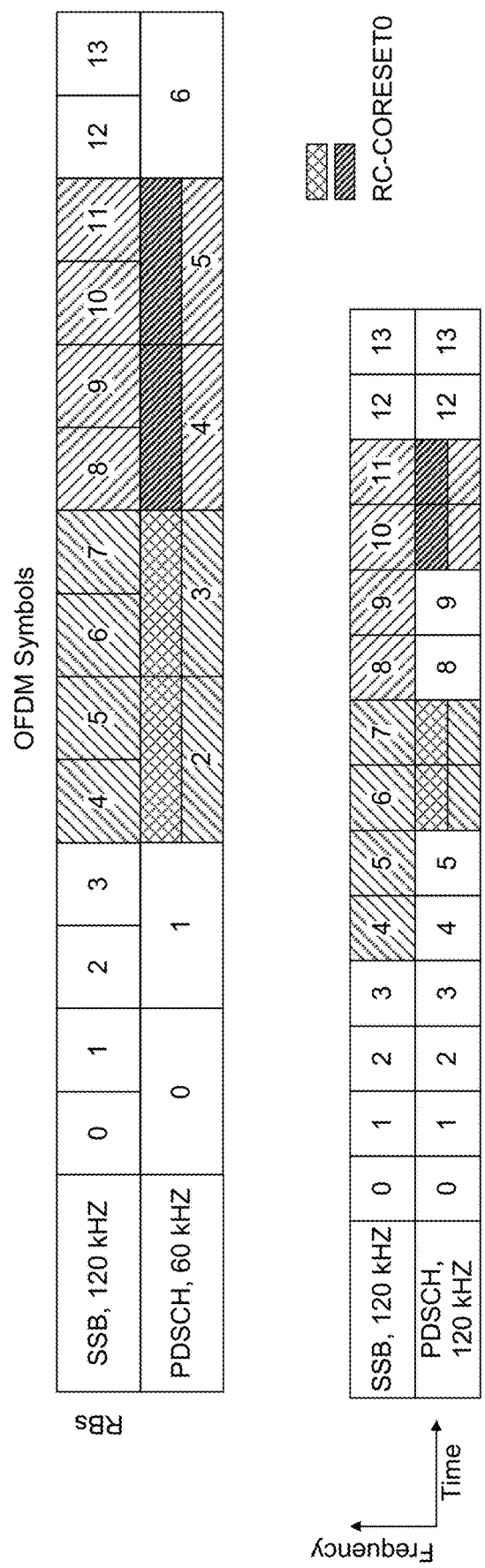
Figure 6 RC-CORESET0 Multiplexing with RMSI PDSCH

Figure 7 RC-CORESET0 Multiplexing with RMSI PDSCH

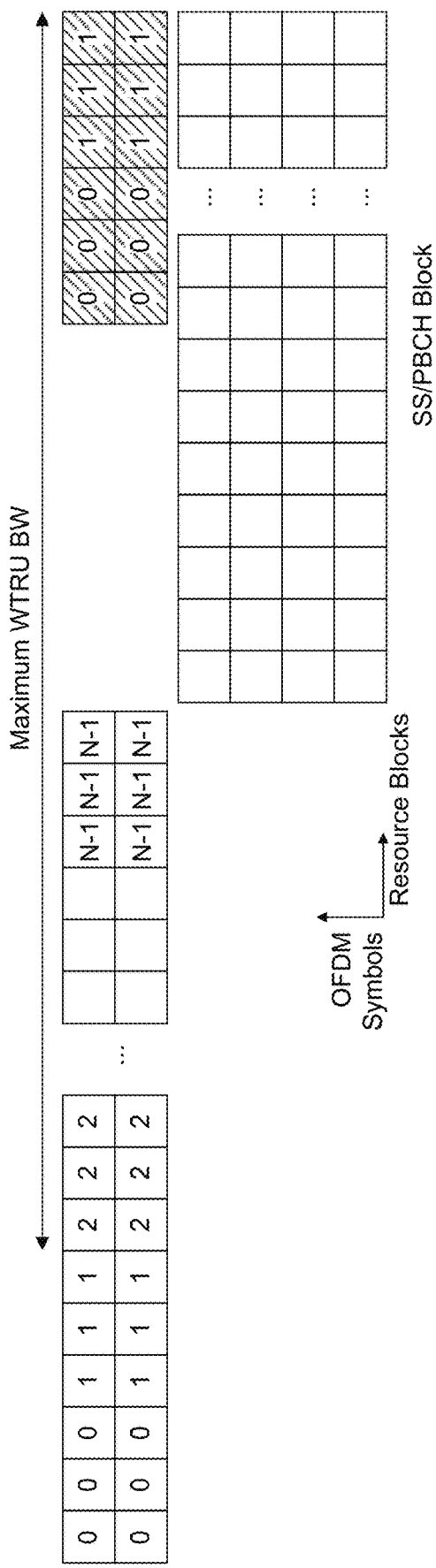
Figure 10 Repetition of REGs
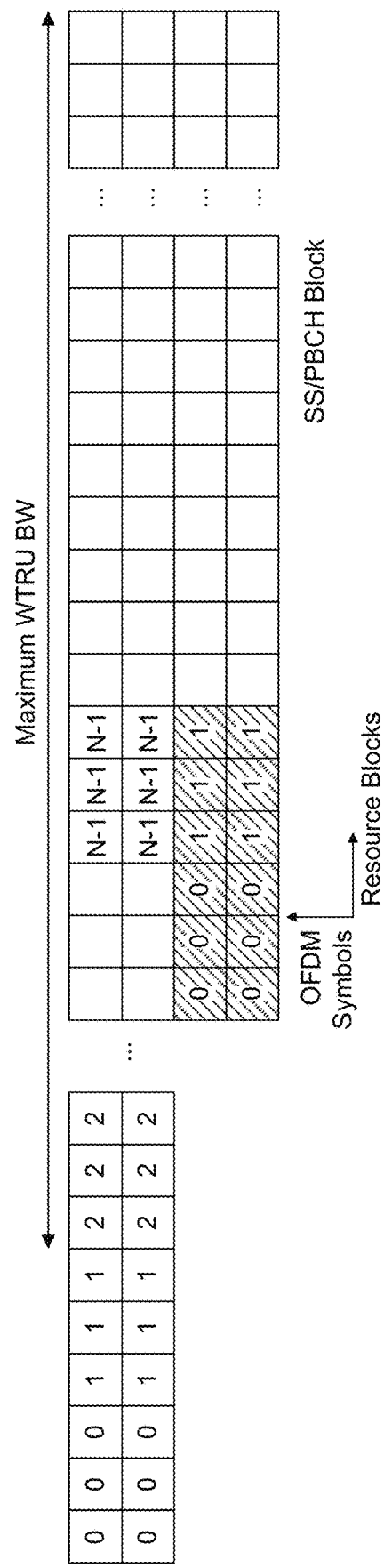
Figure 11 Repetition of REGs

METHODS, APPARATUS, AND SYSTEMS FOR REDUCED BANDWIDTH FOR REDUCED CAPABILITY WTRUS

CROSS-REFERENCE TO RELATED APPLICATIONS

This application is a continuation of U.S. Non-Provisional application Ser. No. 18/270,658, filed Jun. 30, 2023, which is the 371 National Stage of International Application No. PCT/US2022/012143, filed Jan. 12, 2022, which claims the benefit of U.S. Provisional Application No. 63/136,402, filed Jan. 12, 2021, the entire contents of which are incorporated herein by reference.

BACKGROUND

The present invention relates to the field of computing and communications and, more particularly, to methods, apparatus, systems, architectures and interfaces for computing and communications in an advanced or next generation wireless communication system, including communications carried out using a new radio and/or new radio (NR) access technology and communication systems. Such NR access and technology, which may also be referred to as 5G, and/or other similar wireless communication systems and technology may include features and/or technologies for any of cell search, NR PDCCH and search spaces, and system information (SI). For a cell search procedure, a WTRU acquires time and frequency synchronization with a cell and detects a physical layer Cell ID of the cell, using a primary synchronization signal (PSS), a secondary synchronization signal (SSS), and a physical broadcast channel (PBCH). A WTRU is assigned with a set of PDCCH candidates for monitoring, for example, during the blind detection of PDCCH. A search space or a set of search spaces may include a set of PDCCH candidates. Further, System Information (SI) is divided into blocks, for example, for any of master, system and positioning information

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 2 is a diagram illustrating a 'synchronization signal/ Physical Broadcast Channel (SS/PBCH) block structure;

FIG. 3 is a diagram illustrating a SSB and/or RMSI CORESET and RMSI PDSCH multiplexing patterns;

FIG. 4 is a diagram illustrating a multiplexing technique for a second pattern;

FIG. 5 is a diagram illustrating a multiplexing technique for a third pattern;

FIG. 6 is a diagram illustrating multiplexing of a RC-CORESET0 with a RMSI PDSCH, according to embodiments;

FIG. 7 is a diagram illustrating another multiplexing of a RC-CORESET0 with a RMSI PDSCH, according to embodiments;

FIG. 10 is a diagram illustrating repetition of REGs, according to embodiments;

FIG. 11 is a diagram illustrating another repetition of REGs, according to embodiments.

EXAMPLE NETWORKS FOR IMPLEMENTATION OF THE EMBODIMENTS

Figure 1A:
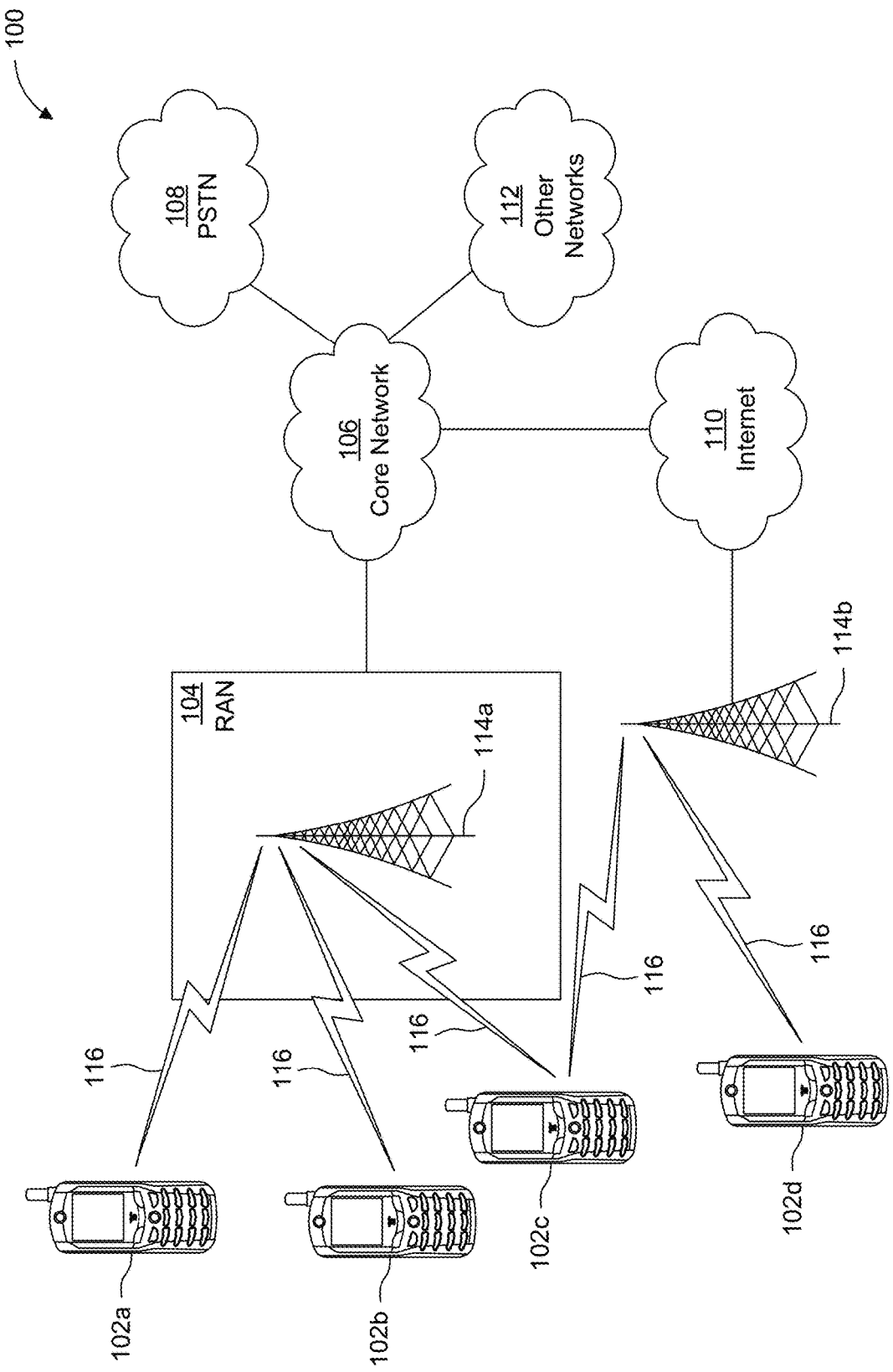
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VOIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
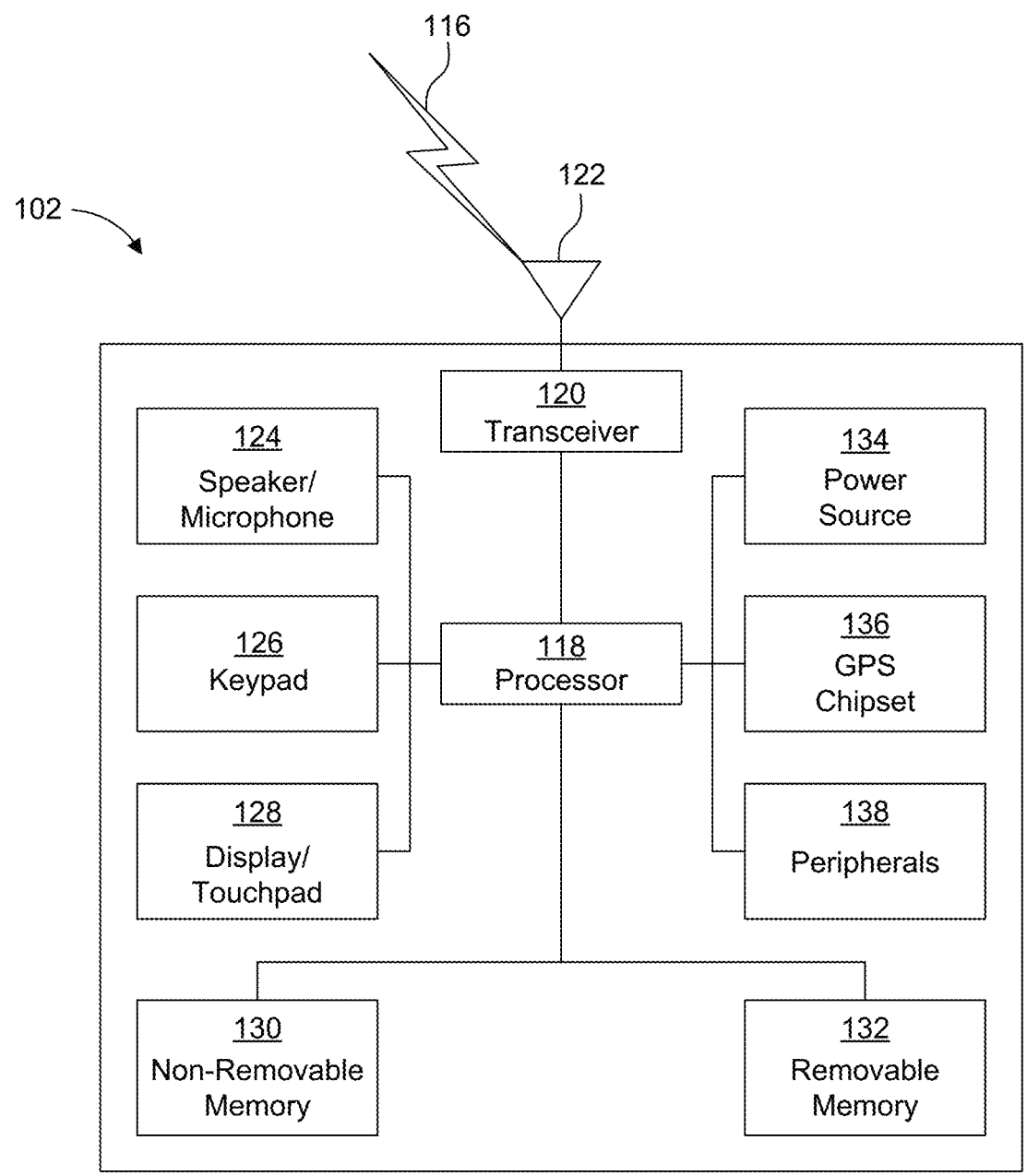
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
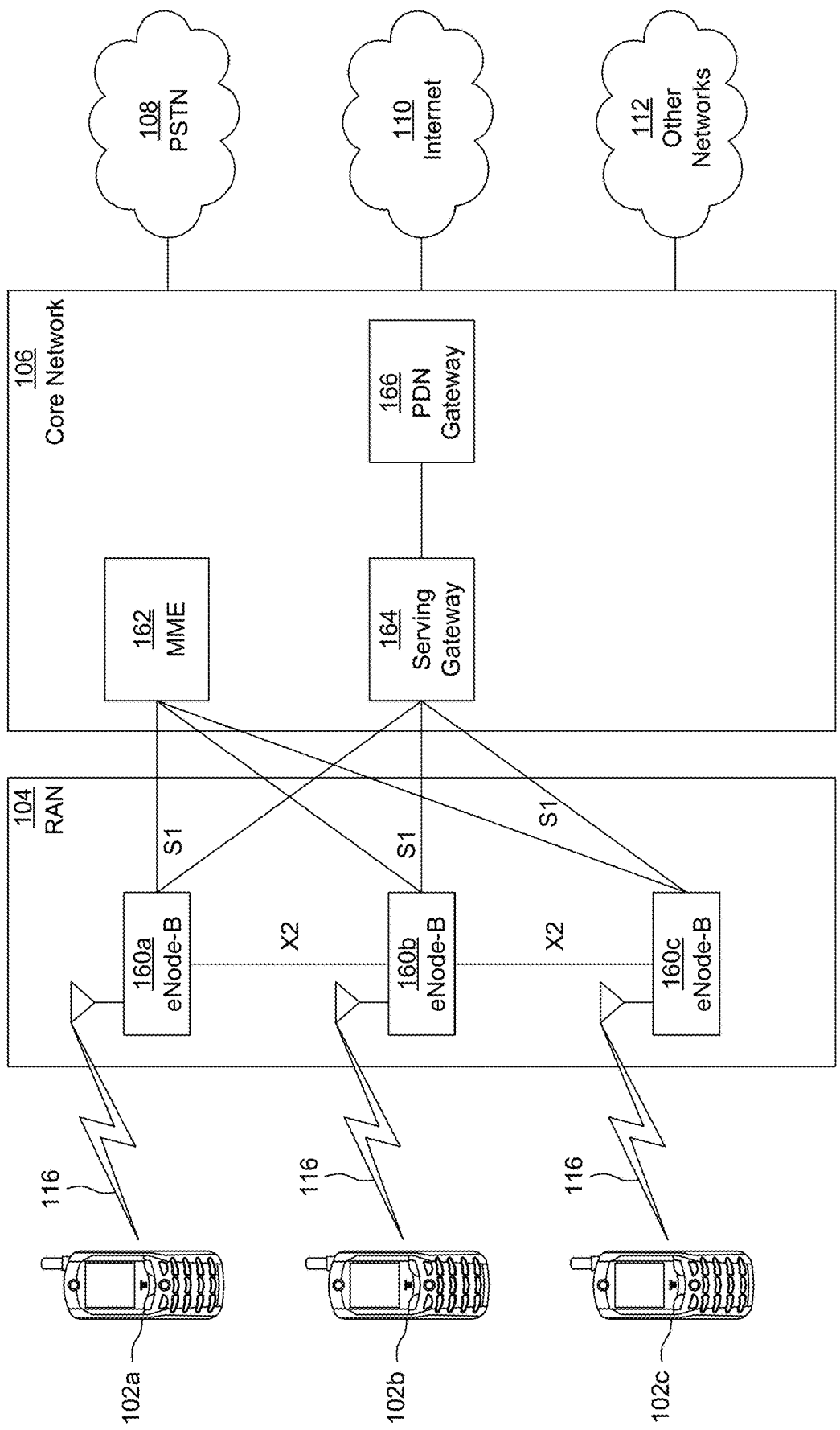
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the Node-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
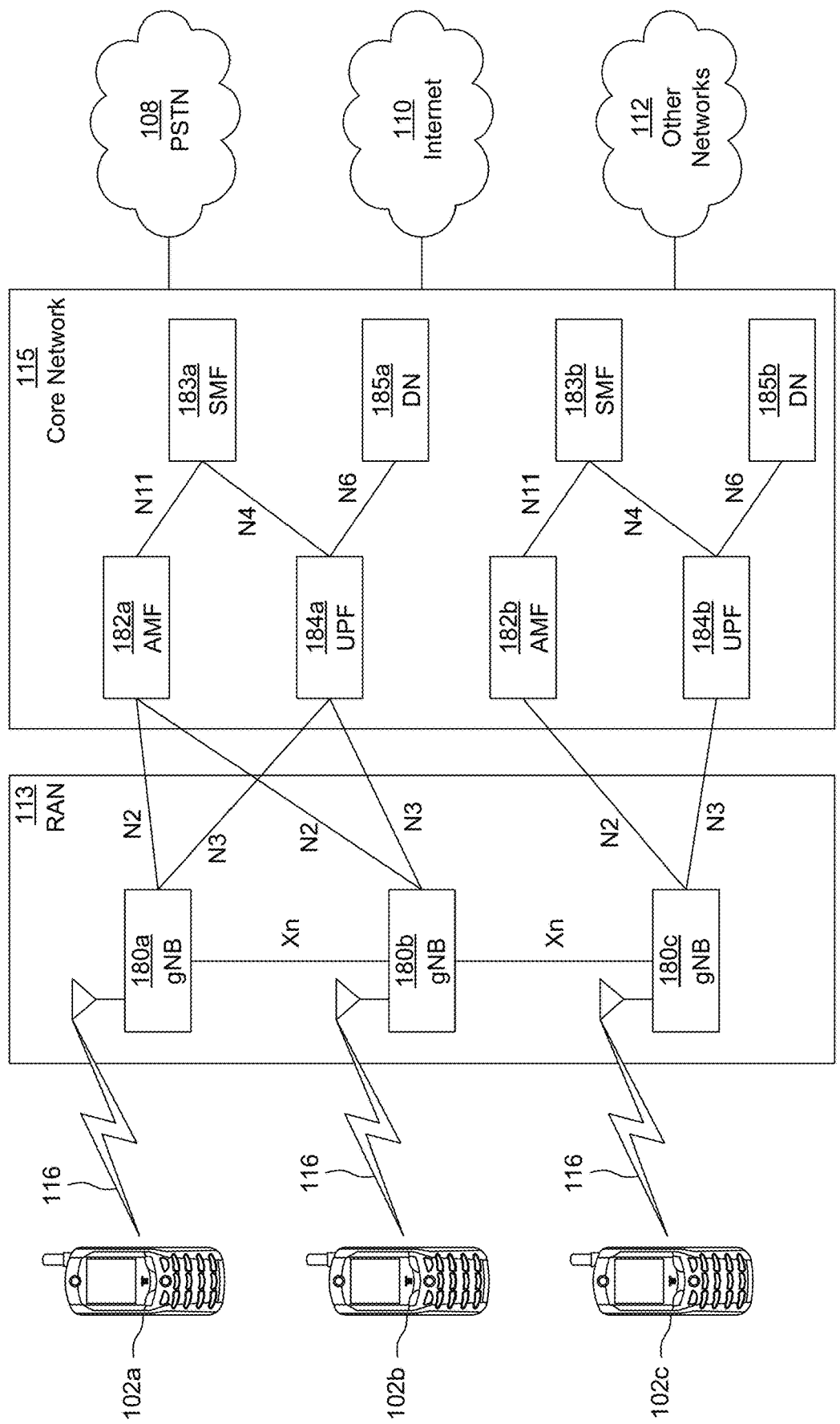
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Synchronization

FIG. 2 is a diagram illustrating a 'synchronization signal/Physical Broadcast Channel (SS/PBCH) block structure.

Cell search is a procedure, for example, performed by a WTRU, for acquiring time and frequency synchronization with a cell, and for detecting a physical layer Cell ID of the cell. For acquiring time and frequency synchronization, the signals used for synchronization, that is, synchronization signals (SSs) include the primary SS (PSS) and the secondary SS (SSS). Referring to FIG. 2, a physical broadcast channel (PBCH), the PSS, and the SSS are transmitted in four consecutive symbols, for example, to form a SS/PBCH block, which may also be referred to as a synchronization signal block (SSB). Upon detection of a SS/PBCH block, the WTRU determines (e.g., detects, acquires, extracts, reads, etc.) a master information block (MIB) from the PBCH. From (e.g., using, based on, etc.) the MIB, the WTRU determines if there is a control resource set (CORESET) for Type0-PDCCH common search space (CSS) which may be referred to as CORESET0, (e.g., the WTRU determines whether CORESET0 exists and/or is included in the MIB). The Type0-PDCCH may contain the PDCCH for remaining master system information (RMSI), which may also be referred to as system information block (SIB) 1 (SIB1).

A synchronization signal burst (SS burst) may be used in a case of using multiple beams for initial access. A SS burst may be transmitted periodically (e.g., every 20 ms), and each SS burst may include any number of (e.g., one or more) SS/PBCH blocks. One or more (e.g., any number of) SSBs in a SS burst may be associated with one or more (e.g., any number of) beams. The number of SSBs in a SS burst may be determined by a gNB, for example, based on the number of beams used at the gNB. As an example, in a case of NB beams being used at a base station (e.g., gNB), NB SS/PBCH blocks may be used and/or transmitted in (e.g., via) a SS burst.

NR PDCCH and Search Spaces

A Resource Element Group (REG) may be (e.g., considered as) the smallest building block for the physical downlink control channel (PDCCH). A (e.g., each) REG may consist of 12 resource elements (REs) on one OFDM symbol in time and one resource block (RB) in frequency. In a (e.g., each) REG, 9 REs may be used for control information, and 3 REs may be used for demodulation reference signal (DMRS). Multiple REGs (e.g., 2, 3, or 6) that are adjacent in time and/or frequency, may form an REG bundle. The REG bundle uses a same precoder (e.g., for each RE), and associated DMRSs may be used together for channel estimation. 6 REGs (e.g., in the format of 1, 2, or 3 REG bundles) may form one Control Channel Element (CCE), and a CCE may be the smallest possible PDCCH. A (e.g., each) PDCCH may consist of any number of (e.g., one or multiple) CCEs (e.g., 1, 2, 4, 8, or 16 CCEs). The number of CCEs for a PDCCH may be referred to as an (e.g., called its) aggregation level (AL).

Mapping of REG bundles may use (e.g., be for) interleaving or non-interleaving. In the non-interleaving mapping, consecutive REG bundles (e.g., adjacent in frequency) may form a CCE, and CCEs adjacent in frequency may form a PDCCH. In the interleaving mapping, REGs may be are interleaved (or permuted) before being mapped to CCEs, resulting in (e.g., generally) non-adjacent REG bundles in one CCE and non-adjacent CCEs in one PDCCH. A Control Resource Set (CORESET) may include and/or be associated with (e.g., configured by) any of (e.g., the CORSET may include/comprise at least one of): (1) a frequency assignment (e.g., as chunks of 6 RBs), (2) a length in time (e.g., 1-3 OFDM symbols), (3) a type of REG bundle, and (4) a type of mapping from REG bundles to CCEs (e.g., interleaving or non-interleaving mapping). In a (e.g., each) bandwidth part (BWP), there may be up to a N (e.g., 3) CORESETs. For example, there may be 12 CORESETs in 4 (e.g., possible) bandwidth parts.

A WTRU may monitor, or may be assigned with, a set of PDCCH candidates (e.g., to monitor). For example, a set of PDCCH candidates may be monitored during the blind detection of a PDCCH. A search space or a set of search spaces (e.g., for multiple ALs) may be (e.g., include) a set of PDCCH candidates, for example, for a WTRU to monitor using (e.g., with) blind detection. A search space or (e.g., each of a) set of search spaces may be configured by any (e.g., at least one) of: (1) an associated CORESET, (2) a number of candidates for, or within, each aggregation level, and (3) a set of monitoring occasions. The monitoring occasions may be determined by any of a monitoring periodicity (e.g., in terms of slots), a monitoring offset, and a monitoring pattern (e.g., with 14 bits corresponding to the possible patterns of symbols inside a slot).

System Information

System Information (SI) may include (e.g., is divided into): a MIB, any number of system information blocks (SIBs), and positioning SIBs (posSIBs). The MIB includes parameters that are needed to acquire a first SIB, SIB1, from the cell. The MIB contents in New Radio (NR) Release-16 is shown below.

```
MIB ::=                         Sequence {
    systemFrameNumber               BIT STRING (SIZE (6)),
    subCarrierSpacingCommon         ENUMBERATED {scs15or60, scs30or120],
    ssb-SubcarrierOffset            INTEGER (0 . . . 15),
    dmrs-TypeA-Position             ENUMBERATED {pos2, pos3},
    pdcch-ConfigSIB1                PDCCH-ConfigSIB1,
    cellBarred                      ENUMERATED {barred, notBarred},
    intraFreqReselection            ENUMBERATE {allowed, notAllowed},
    spare                           Bit string (SIZE(1))
}
-- TAG-MIB-STOP
-- ASN1STOP
```

The SIB1 is transmitted on the downlink shared channel (DL-SCH). In a case where a WTRU, during cell search, determines (e.g., from the MIB) that a CORESET for Type0-PDCCH CSS set is present, then the WTRU: (1) determines a number of consecutive resource blocks and a number of consecutive symbols for the CORESET of the Type0-PDCCH CSS set from controlResourceSetZero in pdcch-ConfigSIB1 in the MIB; and (2) and determines PDCCH monitoring occasions from searchSpaceZero in pdcch-ConfigSIB1.

Figures 4, 5:
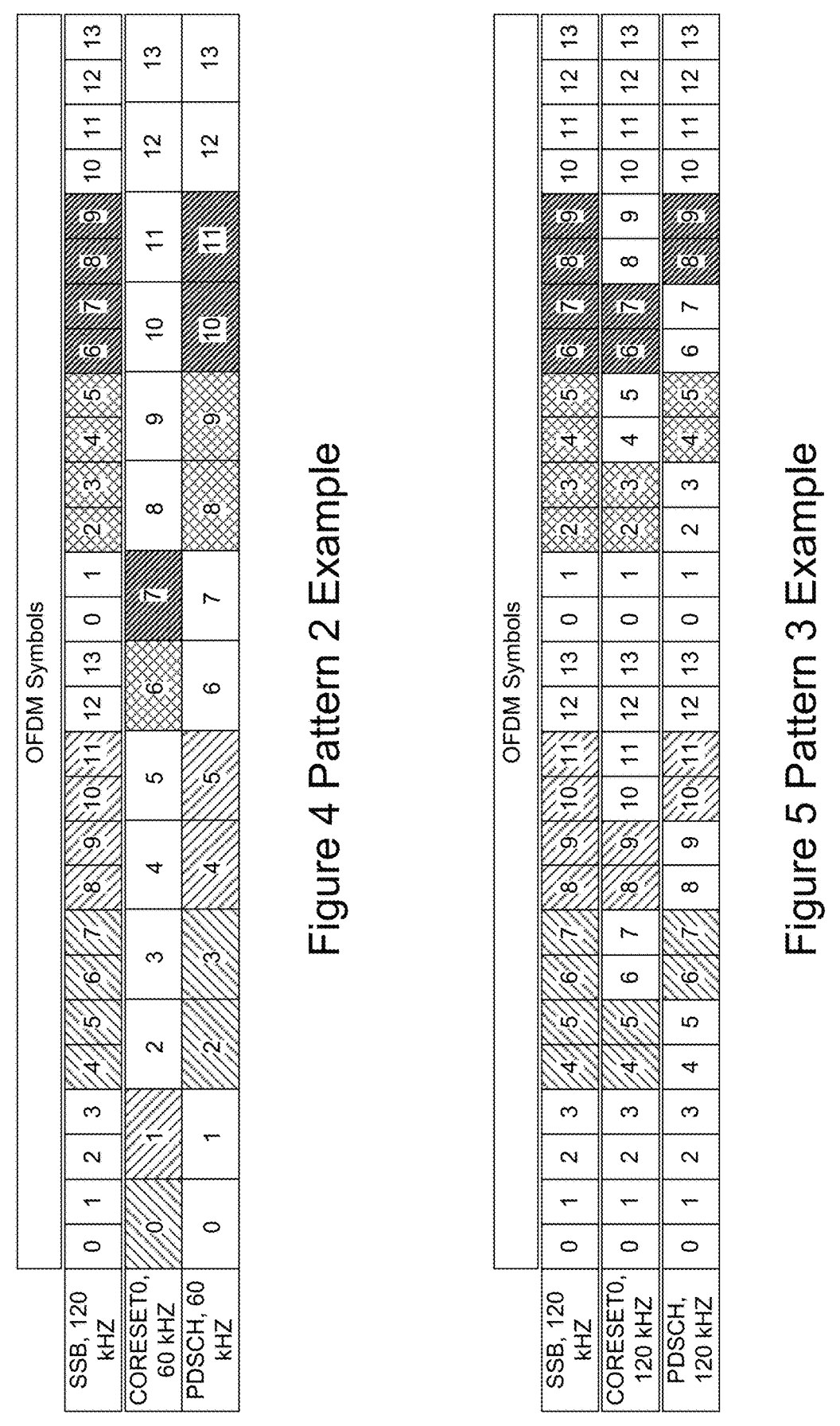

FIG. 3 is a diagram illustrating a SSB and/or RMSI CORESET and RMSI PDSCH multiplexing patterns; and FIG. 4 and FIG. 5 are diagrams illustrating multiplexing techniques respectively for a second pattern and third pattern.

A SSB and a corresponding CORESET0 may be multiplexed in three possible patterns, for example, as shown in FIG. 3. Referring to FIG. 3, the patterns shown are for illustration purposes (e.g., only), and the (e.g., exact) multiplexing pattern may be any suitable pattern, and for example, may depend on the subcarrier spacing (SCS), carrier frequency, etc. In a case where a WTRU is not provided an initial downlink bandwidth part (BWP) (e.g., a parameter initialDownlinkBWP), the CORESET0 may indicate (e.g., also may define) an initial downlink BWP.

There may be multiplexing techniques for patterns, such as, for example, referring to FIG. 4 and FIG. 5 respectively, pattern 2 and pattern 3. In FIG. 4 and FIG. 5, the SSB and RMSI PDCCH/PDSCH denoted with the same patterns are associated to each other. For example, FIG. 4 shows a sample multiplexing pattern for time multiplexing of SS/PBCH blocks and the associated CORESET0 and PDSCH, when the SCS of the SSB is 120 kHz and the SCS of the CORESET0/PDSCH is 60 kHz. Referring to FIG. 4, the OFDM symbols of associated SSB/CORESET0/PDSCH are denoted with the same pattern. As an example, an SSB is transmitted in OFDM symbol 4 through OFDM symbol 7, and the corresponding CORESET0 is transmitted in OFDM symbol 0 in the same slot, while the associated PDSCH is transmitted in OFDM symbols 2 and 3. In the case of FIG. 4, since the subcarrier spacings used for the SSBs and the CORESET0/PDSCH is different, the CORESET0/PDSCH OFDM symbol is twice as long as the SSB OFDM symbol. Referring to FIG. 5, there may be (e.g., another) pattern for a different set of SCSs.

There may be a case of a WTRU having reduced capability, which may be referred to as a reduced capability (i.e., RedCAP or RC) WTRU. In the case of a RC WTRU, a maximum transmission bandwidth of the RC WTRU may be smaller than the bandwidth (BW) used in a system. In such a case, for example, in certain configurations, a RC WTRU may not be able to receive all of a bandwidth allocated to the SSBs and the CORESET0 in an initial downlink BWP. For example, there may be (e.g., has been agreement on) a maximum RC WTRU BW of 100 MHZ (e.g., in NR Rel-17). However, in certain configurations and/or cases, the total BW allocated to the SSB and the associated CORESET0 may be over 120 MHZ. Further, in the above or other cases, the number of RC WTRUs in a system may be much higher than the number of regular (e.g., not-reduced capability) WTRUs. In such cases, the resource fragmentation between RC and regular WTRUs in the initial BWP may negatively impact the performance of regular WTRUs. That is, delays may be observed, for example, during a random-access procedure.

RC WTRU in Coverage Enhancement (CE) Mode

According to embodiments, a WTRU may have reduced capabilities, or in other words, a WTRU may be a RC WTRU. For example, according to embodiments, a maximum bandwidth supported by a RC WTRU may be less than a bandwidth available in (e.g., supported by) a system (e.g., a network). As another example, according to embodiments, a bandwidth supported by a RC WTRU may be smaller than a bandwidth used by an aspect of the system. According to embodiments, an aspect of the system may, for example, include any of: a BWP, such as a DL BWP or UL BWP; an initial BWP; a default BWP; the number of RBs needed (e.g., associated) and/or used for a CORESET; the number of RBs needed (e.g., associated) and/or used for a CORESET 0, e.g., the CORESET 0 for (e.g., associated with) or used by non-reduced capability WTRUs.

According to embodiments, a RC WTRU may be in a Coverage Enhancement (CE) mode, which may refer to a WTRU supporting transmission schemes for enhancing coverage. A WTRU may be any of (e.g., both) a RC WTRU and a coverage enhanced WTRU. According to embodiments (e.g., without loss of generality) a WTRU may be referred to as any of a RC WTRU and a RC/CE WTRU. A non-RC/CE WTRU, or in other words, an non-reduced capability/non-coverage enhancement WTRU, may also be referred to as a regular (e.g., or ordinary, conventional, etc.) WTRU. According to embodiments, any system aspect and/or property of a system aspect (e.g., number of RBs, RB location, time location, RB pattern, time pattern, SCS, among others) may be indicated in a MIB.

According to embodiments, a CORESET, such as any of a CORESET0, a CORESET of the Type0-PDCCH CSS, and a CORESET of the Search Space Zero (SS0), may be different for (e.g., different between) RC/CE WTRUs and/or other types of WTRUs (e.g., non-RC/CE WTRUs). According to embodiments, any (e.g., one or more) of a first CORESET0, a first SS0, and a first Type0-PDCCH CSS may be (e.g., intended) for and/or used by a first set of WTRUs (e.g., a set of one or more non-RC/CE WTRUs), and any of a second CORESET0, a second SS0, and a second Type0-PDCCH CSS may be (e.g., intended) for and/or used by a second set of WTRUs (e.g., a set of one or more RC/CE WTRUs). As referred to herein, the terms RC-CORESET 0, RC-SS0, and RC-Type0-PDCCH CSS may be used, respectively, for the second CORESET0, the second SS0, and the second Type0-PDCCH CSS. However, the disclosure and/or embodiments are not limited to such terms, and any suitable names and/or terms may be used and/or referred to herein, including the names of the first CORESET 0, SS0, Type0-PDCCH CSS, and still be consistent with the embodiments and examples described herein. As referred to herein, CORESET #0 and an initial BWP may be used interchangeably.

Indication to WTRU to Offload to Another Initial BWP (CORESET #0)

According to embodiments, a RC WTRU may a RC-UE may be provided (e.g., signaled, informed of, indicated, notified, etc.) parameters. For example, according to embodiments, a PBCH/MIB may be used to provide, for example, to the RC WTRU, (e.g., several) parameters of the RC-Type0-PDCCH CSS, such as, for example, the monitoring occasions, and parameters of the RC-CORESET0, such as, for example, the number of RBs in the RC-CORESET0, the frequency location of the RC-CORESET0, the number of symbols in the RC-CORESET, etc. According to embodiments, a WTRU may do any of: (1) detect a first SS/PBCH block; (2) receive and/or decode an associated PBCH/MIB in an SSB; and (3) compute the kSSB (ssb-SubcarrierOffset) value from the ssb-SubcarrierOffset bits in the MIB and/or the PBCH payload.

According to embodiments, in a case where a kSSB value is within a (e.g., specific) range (for example, kSSB>23 for FR1, and kSSB>11 for FR2), such may indicate, for example, to a regular WTRU, that a CORESET for Type0-PDCCH-CSS set associated to the SS/PBCH block is not present. According to embodiments, a kSSB (e.g., the same kSSB) value may (e.g., also) indicate (e.g., to a regular WTRU) a channel number of a second SS/PBCH block having a CORESET for an associated Type0-PDCCH-CSS. According to embodiments, a kSSB (e.g., a/the same kSSB) value may indicate, for example, to a RC-WTRU, that a RC-CORESET for an associated RC-Type0-PDCCH-CSS is present. According to embodiments, in the case of the same kSSB value, a RC-WTRU may determine that a RC-CORESET for an associated RC-Type0-PDCCH-CSS is present. In such a case, according to embodiments, the RC-WTRU may determine the monitoring occasions, and other parameters of the RC-Type0-PDCCH-CSS, and/or the associated RC-CORESET0, from the pdcch-ConfigSIB1 bits in the MIB. According to embodiments, a kSSB value may be interpreted differently by different WTRUs, for example, according to a WTRU type, wherein the WTRU type may include and/or be associated with any of a WTRU capability, a WTRU category, a maximum supportable bandwidth, a number of (e.g., receive) antennas, etc.

According to embodiments, at least one bit (e.g., any number of bits) in any of the MIB and/or the PBCH payload may indicate, for example, to a RC WTRU, that a RC-CORESET for an associated RC-Type0-PDCCH-CSS is present. For example, according to embodiments, a (e.g., one) bit in the MIB may (e.g., be used to) indicate (e.g., to the RC WTRU) that a RC-Type0-PDCC-CSS is any of present or not present, for example, by setting the bit to 1 or 0, respectively. Using this bit, the RC-WTRU may determine the presence or non-presence of the RC-CORESET. According to embodiments, any number of (e.g., bit) indications (e.g., in the MIB) may be used simultaneously, and any number of such indications may be intended for and/or used by any number of different (e.g., types of) WTRUs, such as, for example, RC-WTRUs and non-RC WTRUs.

According to embodiments, there may be a case where: (1) the kSSB value may be (e.g., intended) for and/or used by a regular WTRU, for example, to determine the presence (or non-presence) of CORESET0, and (2) a one-bit indication in the MIB or the PBCH may be (e.g., intended) for and/or used by a RC-WTRU, for example, to determine the presence (or non-presence) of RC-CORESET0. According to embodiments, there may be a case where a RC-WTRU determines, for example, from a bit(s) in the MIB/PBCH, that RC-CORESET0 is present. In such a case: (1) the kSSB value may be determined to be invalid by a RC-WTRU, for example, according to the subcarrier offset determined by ssb-SubcarrierOffset being set to a default value, such as 0; or (2) the kSSB value may be used to determine (e.g., only) the subcarrier offset, and/or the kSSB value may not be used to determine the presence or non-presence of RC-CORESET0.

According to embodiments, there may be a scenario, for example, as described below. In such a scenario, a kSSB may be determined to be: (a) 24≤kSSB≤29 for FR1, or (b) 12≤kSSB≤13 for FR2, by any (e.g., both) of the RC-WTRU and the regular WTRU. According to embodiments, in such scenario, the regular WTRU may determines that CORESET0 is not present. Further, in such scenario, the RC-WTRU may determine, for example, from a bit in the MIB, whether RC-CORESET0 is present. In a case where RC-CORESET0 is present, the RC-WTRU may determines the search space parameters, for example, according to (e.g., based on, from, etc.) pdcch-ConfigSIB1. According to embodiments, in a case where there is no such bit in the MIB, the RC-WTRU may determine (e.g., assume by default) that RC-CORESET0 is present, and the RC-WTRU may monitor the PDCCH according to (e.g., using) search space parameters, for example, determined according to pddch-ConfigSIB1.

According to embodiments, according to (e.g., based on, from, etc.) a same set of bits in the MIB (e.g., the pdcch-ConfigSIB1 field), any of (e.g., both of) the regular WTRU and the RC WTRU may determine any of the Type0-PDCCH-CSS, CORESET0, RC-Type0-PDCCH-CSS, and RC-CORESET0. According to embodiments, any of the CORESET0 parameters and the SS0 parameters, such as, for example, the SSB/CORESET0 multiplexing pattern, set of RBs and slots symbols of CORESET0, PDCCH monitoring occasions for SS0, may be determined by the regular WTRU. For example, according to embodiments, a WTRU, such as the regular WTRU, may associate (e.g., may map, may perform a mapping of, etc.) the controlResourceSetZero in pdcch-ConfigSIB1 and the searchSpaceZero in pdcch-ConfigSIB1 to an entry in a (e.g., corresponding, mapping, etc.) table, for example, for a given subcarrier spacing of a SSB and a PDCCH. According to embodiments, a RC WTRU may determine the location of the RC-CORESET0 in frequency, for example, by applying an offset (e.g., in terms of RBs and/or subcarriers) to any of the first RB and/or the first subcarrier of CORESET0. According to embodiments, a bandwidth of a RC-CORESET0 may be less than a size of CORESET0.

According to embodiments, a kSSB value may indicate that a CORESET0 associated to the SSB is present. According to embodiments, a RC WTRU may determine not to monitor the Type0-PDCCH-CSS, for example, in a case where any of the following (e.g., first through eleventh) conditions are met. According to embodiments, a first condition may be that a BW of the indicated CORESET0 is above a threshold (e.g., or larger than a predetermined value). For example, a condition may be that a BW of the CORESET0 is greater than 50 MHz. According to embodiments, a second condition may be that a total BW, including (e.g., of, a sum of, etc.) the BW of the indicated CORESET0 and the BW of the SSB, is above a threshold. For example, a condition may be that a total BW is greater than 100 MHZ.

According to embodiments, a third condition may be that the total BW (e.g., the BW of the indicated CORESET0 combined with the BW of the SSB) less (e.g., minus, subtracted by, etc.) an overlap BW (e.g., the BW over which CORESET0 and the SSB overlap) is above a threshold. According to embodiments, a fourth condition may be that a BW from the first subcarrier of CORESET0 to the last subcarrier of the SSB is above a threshold. For such a case, the first subcarrier of CORESET0 may be determined as the subcarrier on the common grid overlapping with subcarrier 0 of CORESET0, and the last subcarrier of the SSB may be determined as the subcarrier on the common grid overlapping with the last subcarrier of the SSB. According to embodiments, a fifth condition may be that the BW from the first subcarrier of the SSB to the last subcarrier of CORESET0 is above a threshold. In such a case, the first and last subcarriers may be determined from the subcarriers in the common grid that overlap with the first subcarrier of the SSB and the last subcarrier of CORESET0.

According to embodiments, a sixth condition may be that a (e.g., the SSB/CORESET0) multiplexing pattern is a specific pattern, such as, for example, pattern 2 or pattern 3, as discussed above. According to embodiments, a seventh condition may be associated with a time multiplexing technique of CORESET0 and the SSB. For example, a condition may be that CORESET0 and the SSB are transmitted in the same OFDM symbols. According to embodiments, a eighth condition may be associated with a threshold (e.g., that may be used in any of the herein discussed conditions) determined according to (e.g., based on, from, etc.) a maximum WTRU BW, such as, for example, a threshold that is (e.g., equal to) a sum of a maximum WTRU BW and a margin.

According to embodiments, a ninth condition may be that a SCS of the SSB and a PDCCH belong to a predetermined set, such as, for example, 120 kHz-120 kHz, 240 kHz-120 kHz, etc. According to embodiments, a tenth condition may be that a frequency band is one of a predetermined set of bands, such as, for example, FR2. According to embodiments, an eleventh condition may be that a RC-WTRU does not (e.g., cannot) receive the PDCCH in CORESET0 within a (e.g., certain, given, etc.) time window. For example, a condition may be that the RC-WTRU does not (e.g., may not, cannot, etc.) receive and/or successfully decode the PDCCH in k frames. According to embodiments, the time window may be determined according to (e.g., in terms of) any of frames, slots, symbols, and a combination of such.

According to embodiments, in a case where a RC WTRU determines not to monitor, or not to further monitor, the Type0-PDCCH-CSS, the RC WTRU may be provided (e.g., signaled, informed of, indicated, configured with) at least one channel for monitoring (e.g., in which the RC WTRU may monitor) any of a Type0-PDCCH-CSS or a RC-Type0-PDCCH-CSS. According to embodiments, a kSSB value may be interpreted (e.g., used) by a WTRU to determine a global synchronization channel number (GSCN), for example, as a GCSN_SSB summed with a GCSN_offset, in order to find (e.g., determine) a second SS/PBCH block. For example, according to embodiments, a RC WTRU may determine any number of GCSN_offset values according to (e.g., based on, from, etc.) the kSSB, for example, in a case where kSSB≤23 for FR1, and kSSB≤11 for FR2. According to embodiments, a RC-WTRU may search a (e.g., another) channel to find a second SS/PBCH block without being provided information indicating such search.

According to embodiments, a RC WTRU may be provided information indicating whether to monitor the Type0-PDCCH-CSS and/or use CORESET0, for example, using explicit signaling. According to embodiments, a RC WTRU may determine, for example, from at least one bit in the MIB and/or the PBCH payload, whether to monitor the PDCCH or search for another SSB in another channel. According to embodiments, a RC WTRU may receive a configuration in SIB1 of an initial BWP other than the one (e.g., BWP) in which (e.g., a previous) SIB1 is (e.g., previously) received. According to embodiments, a RC WTRU may determine to move to an indicated initial BWP according to any of an explicit signal and an implicit signal. According to embodiments, an explicit signal may be provided as any of an indication in SIB1 or a paging message. According to embodiments, in the case of an implicit signal, a RC WTRU may determine to camp on an indicated BWP if random access attempts in a current initial BWP are not successful, for example, within a predetermined and/or signaled (e.g., configured) time window. For example, such a time window may be the time it takes for the RC WTRU to successfully complete random access in the current initial BWP being equal to or greater than a minimum time threshold.

Multiplexing of RC-CORESET0 and RMSI PDCCH/PDSCH

According to embodiments, a RC-CORESET0 may be multiplexed (e.g., using any of time and/or frequency multiplexing) with any of a CORESET0 and/or a RMSI PDSCH, for example, according to a (e.g., predetermined) pattern. According to embodiments, in a case of time multiplexing, a RC WTRU may monitor the RC-PDCCH in the same slots as monitored by a regular WTRU, but in different frames and/or half frames than that monitored by the regular WTRU (e.g., every Nth frame, such that (SFN) modN=0). According to embodiments, a RC WTRU may assume that (e.g., may operate as if) the monitored half-frame does not contain SSBs. For example, the RC WTRU may receive the SSBs in half frame 0 (e.g., or half frame 1) and may monitor the associated RC-PDCCH in half frame 1 (e.g., or half frame 0). According to embodiments, (e.g., other) parameters of the RC-PDCCH (e.g., CORESET size, frequency location, etc.) may be determined according to (e.g., based on, from the, etc.) MIB, for example, in a manner similar to the regular (e.g., NR) WTRUs.

Figure 7:
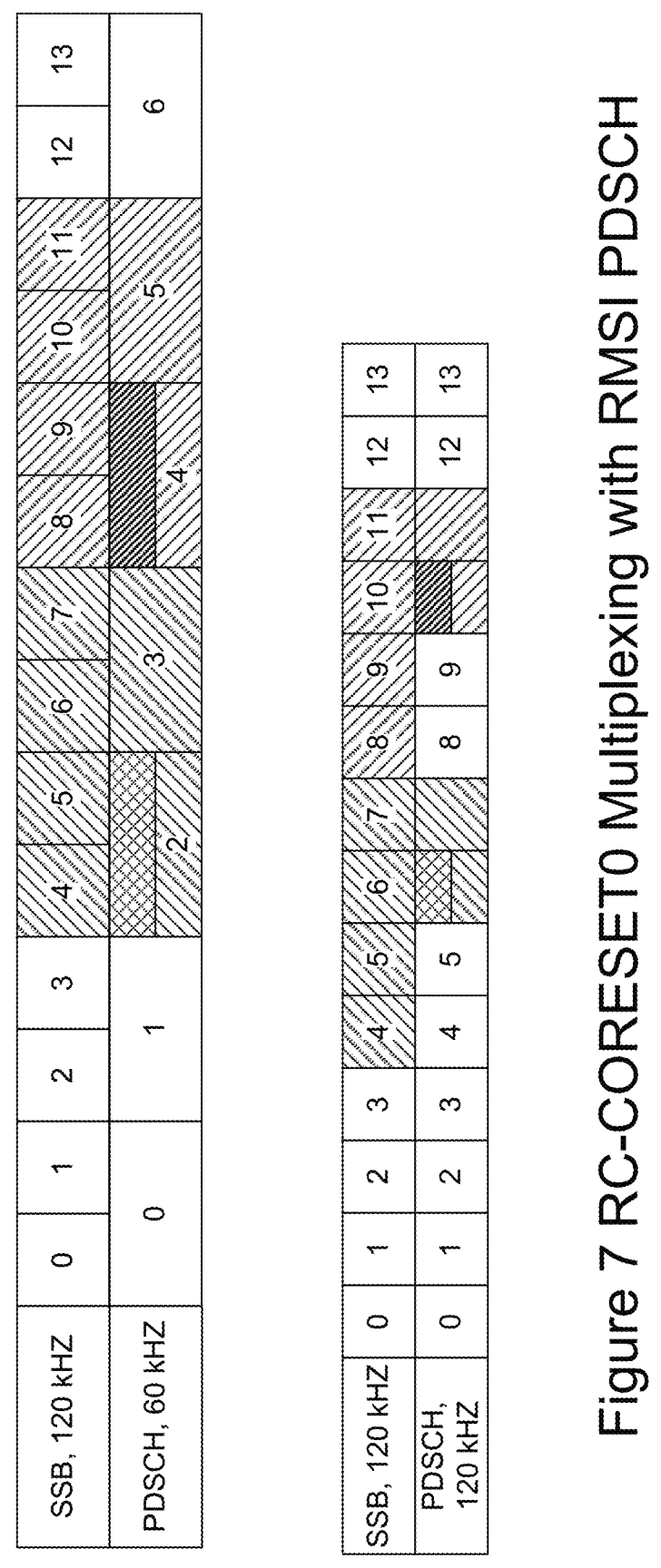

FIG. 6 is a diagram illustrating multiplexing of a RC-CORESET0 with a RMSI PDSCH, according to embodiments. FIG. 7 is a diagram illustrating another multiplexing of a RC-CORESET0 with a RMSI PDSCH, according to embodiments.

According to embodiments, a RC-CORESET0 may be multiplexed with a RMSI PDSCH in any of frequency and/or time domains. According to embodiments, a RC-CORESET0 may be transmitted via (e.g., in a portion of the) resources of OFDM symbols that may have (e.g., carry, include, be possibly scheduled with, etc.) a RMSI PDSCH. According to embodiments, a RC WTRU may monitor a RC-Type0-PDCCH-CSS on at least one of the OFDM symbols that may have the RMSI PDSCH. According to embodiments, a WTRU, such as a RC WTRU, may determine a BW of an associated CORESET0 on which to monitor for control information, for example, which may be considered as a control channel (e.g., PDCCH) for RMSI. That is, for example, according to embodiments, a BW of an associated CORESET0 on which to monitor for the RMSI (e.g., the control information/channel including the RMSI) may be predetermined (e.g., configured), such that a total BW for receiving (e.g., needed to receive) both the SSB and the CORESET0 is less than a maximum WTRU bandwidth (e.g., a maximum BW of the RC WTRU).

According to embodiments, for example, in a case of FIG. 6, wherein the y-axis represents the frequency domain, the RC-CORESET0 may be (e.g., present, included, carried, etc.) in/on the OFDM symbols in which the RMSI PDSCH may be scheduled. According to embodiments, a RC-CORESET0 may be present on two OFDM symbols, for example, referring to FIG. 6, or may be present on one OFDM symbol, for example, referring to FIG. 7. According to embodiments, a DCI format transmitted in/on the PDCCH on (e.g., via, using, etc.) RC-CORESET0 may be a compact DCI, for example, with fewer (e.g., number of) bits than the RMSI PDCCH, and (e.g., the DCI format) may indicate, to the RC WTRU, a frequency location of a CORESET0 that the RC WTRU may attempt to receive. According to embodiments, a dedicated RNTI may be used by the RC WTRU, for example to receive a certain (e.g., RMSI, special, etc.) PDCCH.

According to embodiments, a RC-CORESET0 may be configured and/or determined according to (e.g., based on) a subset of CORESET0 resources, wherein the (e.g., subset of) CORESET0 resources may include any of PRBs, RBs, CCEs, REGs, and REG bundles. According to embodiments, with regard to CORESET0 resources a subset of CORESET0 resources for RC-CORESET0 may be determined according to (e.g., based on) the CORESET0 configuration. For example, the subset of CORESET0 resource for RC-CORESET0 may be determined according to the number of RBs and subcarrier spacing used, configured, or determined for the CORESET0.

According to embodiments, in a case where the subcarrier spacing and/or the number of RBs configured and/or determined for CORESET0 are less than a threshold (e.g., or a predetermined value), then all resources for the CORESET0 may be used and/or determined for the RC-CORESET0. Otherwise, in such a case, a subset of the CORESET0 resources may be used and/or determined for the RC-CORESET0. According to embodiments, with regard to CORESET0 resources a subset of CORESET0 resources for RC-CORESET0 may be determined according to any of a WTRU identity (e.g., IMSI), a WTRU capability (e.g., a number of receive antennas, a supportable maximum bandwidth, a maximum soft buffer size, etc.), and a service type. According to embodiments, with regard to CORESET0 resources in a case where a subset of CORESET0 resources is used for RC-CORESET0, then any of the REG index, the CCE index, and the REG-bundle index are renumbered.

Partial Repetition of a Channel

According to embodiments, a (e.g., one) part of a channel (e.g., a PDCCH, a PDSCH, etc.) may be repeated (e.g., retransmitted) using resources other than the resources used for (e.g., associated with) transmitting the original channel. According to embodiments, there may be a case where the BW of a PDCCH may be N RBs, which may be larger than the maximum WTRU BW of L RBs. In such a case, the WTRU may receive the L RBs of the PDCCH in the original transmission, and may receive the remaining N-L RBs in other time/frequency resources. According to embodiments, a (e.g., another) WTRU, having a maximum BW of at least N RBs, may continue to receive the original transmission, and may determine to ignore the repeated part.

Figure 8:
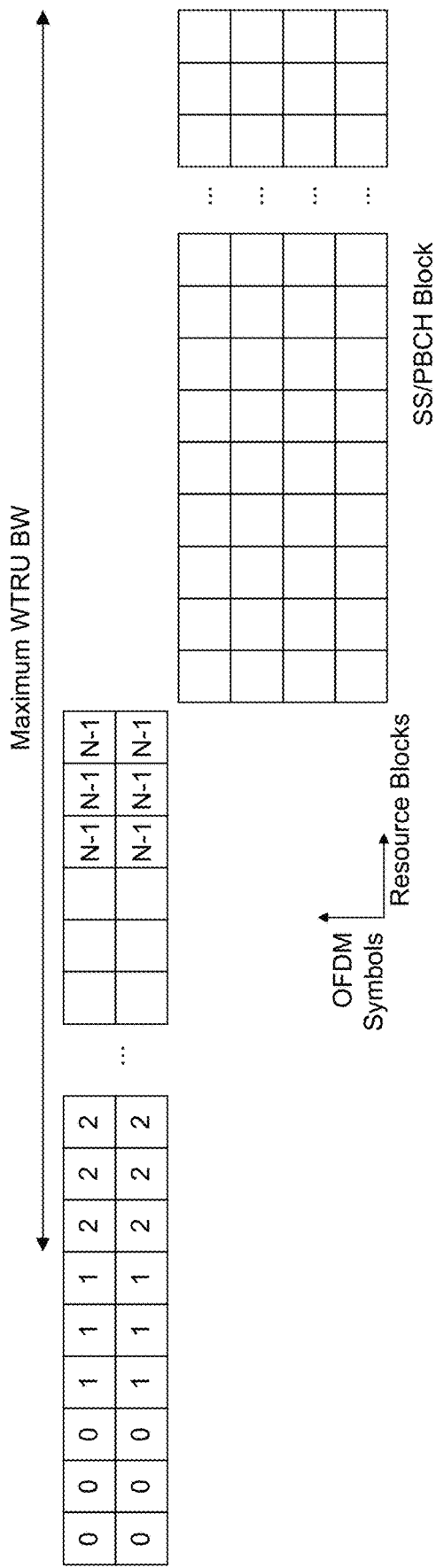
FIG. 8 is a diagram illustrating PDCCH monitoring over two OFDM symbols, according to embodiments.
Figure 9:
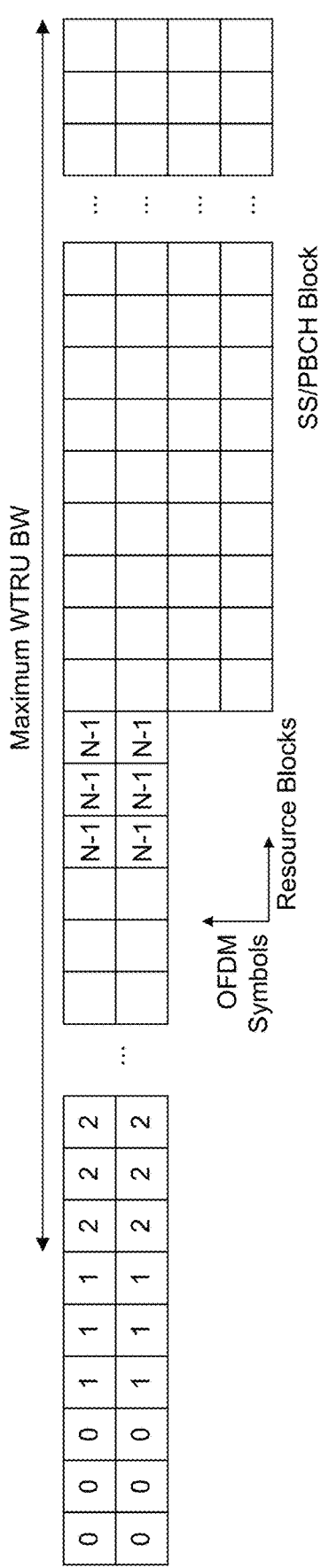
FIG. 9 is a diagram illustrating a CORESET and a SSB on the same OFDM symbols, according to embodiments.

FIG. 8 is a diagram illustrating PDCCH monitoring over two OFDM symbols, according to embodiments. FIG. 9 is a diagram illustrating a CORESET and a SSB on the same OFDM symbols, according to embodiments. FIG. 10 is a diagram illustrating repetition of REGs, according to embodiments. FIG. 11 is a diagram illustrating another repetition of REGs, according to embodiments.

According to embodiments, referring to FIG. 8, a PDCCH may be monitored over two OFDM symbols, and the associated CORESET consists of N−1 REGs. According to embodiments, a SSB may be transmitted over 4 OFDM symbols, and may consist of 20 RBs. In such a case, referring to FIG. 8, the maximum WTRU BW may be sufficient to cover the SSB BW and part of the PDCCH. In such a case, according to embodiments, the 6 RBs that constitute REGs 0 and 1 (e.g., over two OFDM symbols) may not be (e.g., cannot be, are not, etc.) received by such WTRU, for example, because the 6 RBs are outside the frequency range of the receiver of such WTRU. According to embodiments, referring to FIG. 9, a similar scenario is illustrated, wherein the CORESET and the SSB are on the same OFDM symbols.

According to embodiments, OFDM symbols transmitted on resources outside of a frequency range of a receiver (e.g., of a RC WTRU) may be repeated in/on/using other resources, for example, as shown in FIG. 10 and FIG. 11. According to embodiments, referring to FIG. 10 and FIG. 11, REGs 0 and 1 may not (e.g., cannot) be received by the WTRU, since the maximum WTRU BW is not sufficient. According to embodiments, in such a case, these REGs (e.g., REGs 0 and 1) may be repeated in other resources, for example, that are within the frequency range of the receiver of the WTRU.

According to embodiments, indices of repeated REGs may be (e.g., share) the same indices as the original transmission REGs. According to embodiments, in a case where a CCE-to-REG mapping is applied by a RC WTRU, the RC WTRU may use the repeated REGs (e.g., instead of the original transmission REGs) in addition to the REGs that are not repeated and are within the frequency range of the receiver of the RC WTRU. According to embodiments, in such a case, the RC WTRU may map the CCEs to the REGs {2:N−1} and the repeated REGs {0:1}, for example, while performing blind detection of the PDCCH. According to embodiments, a demodulation reference signal (DM-RS) may be such that the original transmission REGs and the repeated REGs have the same DM-RS sequence.

According to embodiments, a DM-RS sequence may be generated and/or mapped to corresponding resources in repeated REGs. For example, according to embodiments, a DM-RS sequence may be generated different from (e.g., separately from/than) a (e.g., original) DM-RS sequence in/of the original PDCCH. According to embodiments, for example, in the above discussed case, a length of the DM-RS sequence, per OFDM symbol, may be determined as 6*4=24 coefficients, for example, assuming that there are 6 repeated RBs in one OFDM symbol, and each RB has reference symbols.

New Initial BWP

According to embodiments, a WTRU (e.g., any of a regular WTRU and a RC WTRU) may receive an SSB in a first BWP. According to embodiments, there may be a case where such WTRU receives and/or monitors an (e.g., such WTRU's) associated CORESET0 (e.g., and/or Type0-PDCCH-CSS) in a second BWP. According to embodiments, for example, in such a case, the first BWP may be referred to as an initial BWP, and the second BWP may be referred to as a RC-initial BWP. According to embodiments, an RC-initial BWP may be interchangeably used with (e.g., and/or refer to) any of an initial BWP, an RC initial BWP, an associated BWP, or an RC-specific initial BWP.

According to embodiments, in such a case, an RC-initial BWP may be configured and/or determined according to any of a frequency band and a bit field in a MIB. According to embodiments, for configuring according to a frequency band, a time and/or frequency offset from the first RB of the determined SSB (e.g., or the first RB of the initial BWP) may be determined according to the frequency band. For example, according to embodiments, a SCS for a SSB may be determined according to a frequency band, where a WTRU may monitor and/or blindly detect SSB. According to embodiments, in such a case, the frequency band may also indicate (e.g., be used to determine) a time and/or frequency offset for the RC-initial BWP.

According to embodiments, for configuring according to a bit field in MIB, a reserved bit in the MIB may be used to indicate a time and/or frequency offset for an RC-initial BWP. According to embodiments, for example, as an alternative, an existing bit field may be re-interpreted to indicate a time and/or frequency offset for an RC-initial BWP. For example, according to embodiments, a kSSB value in a MIB may indicate a time and/or frequency offset for an RC-initial BWP. According to embodiments, for example, in the above discussed case, a first type of WTRU may monitor for a Type0-PDCCH-CSS in a first BWP and a second type of WTRU may monitor for a Type0-PDCCH-CSS in a second BWP. According to embodiments, in such a case, the WTRU type may be determined according to a maximum bandwidth supported (e.g., by the WTRU). According to embodiments, in such a case, the first BWP and the second BWP may be the same BWP, for example, if the number of RBs for a CORESET0 is less than a threshold for a given subcarrier spacing for the CORESET0, and otherwise, the first BWP and the second BWP may be different.

According to embodiments, a second BWP may be (e.g., determined, assumed, etc.) present on condition of any of the following: (1) a subcarrier spacing of the CORESET0 is larger than a threshold; (2) a number of RBs configured for CORESET0 is larger than a threshold; and (3) a network allows a (e.g., certain) type of WTRU(s) (e.g., RC WTRUs) to access the network. According to embodiments, a first BWP and a second BWP may be fully or partially overlapped. According to embodiments, the second BWP may be part of the first BWP. According to embodiments, in a case where the first BWP and the second BWP are fully or partially overlapped, the SCS for the second BWP may be the same as that for the first BWP. According to embodiments, in a case where the first BWP and the second BWP are not overlapped, the SCS for the second BWP may be indicated (e.g., in the MIB). According to embodiments, for example, as an alternative, the SCS for the second BWP may be determined according to the corresponding frequency band, for example, independently from the SCS for the first BWP.

According to embodiments, a CORESET0 (e.g., RC-CORESET0) in a second BWP may be determined according to a configuration of a CORESET0 in a first BWP. For example, according to embodiments, the number of symbols for RC-CORESET0 in the second BWP may be determined according to the number of symbols configured for CORESET0 in the first BWP, and for example, the same number of symbols may be used. According to embodiments, the REG bundle size for RC-CORESET0 in the second BWP may be determined according to the REG bundle size for CORESET0 in the first BWP. According to embodiments, the number of RBs for RC-CORESET0 in the second BWP may be scaled according to the number of RBs for CORESET0 in the first BWP.

According to embodiments, an initial BWP may be located in a different time and/or frequency resource according to (e.g., based on, for, etc.) a WTRU type. For example, according to embodiments, an initial BWP for a first type of WTRU may be located in a first time/frequency resource and an initial BWP for a second type of WTRU may be located in a second time/frequency resource. According to embodiments, a WTRU may receive configuration information associated with (e.g., of, for, applying to, etc.) an initial BWP for another type of WTRUs and its associated channel configuration (e.g., SSB, PDCCH). According to embodiments, in a case where the initial BWPs for the first type of WTRUs and the second types of WTRUs are overlapped, a WTRU may perform any of puncturing and rate-matching around PDSCH REs which may collide with a higher priority channels of the initial BWP associated with another type of WTRUs.

Figure 12:
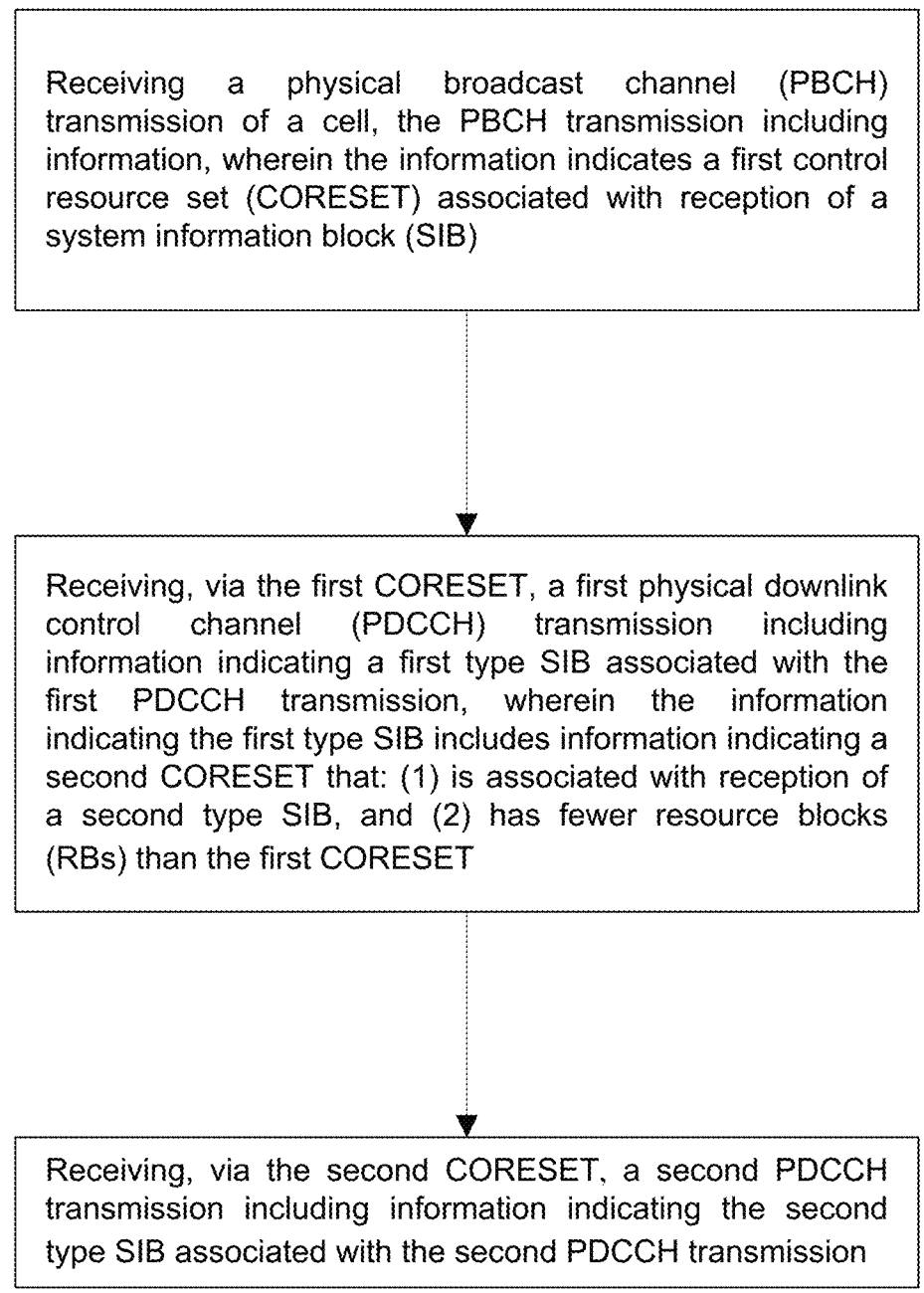
FIG. 12 is a diagram illustrating a method, procedure, operations, etc., for receiving system information, performed by a WTRU, for example, having reduced capacity, according to embodiments.

FIG. 12 is a diagram illustrating a method, procedure, operations, etc., for receiving system information, performed by a WTRU, for example, having reduced capacity, according to embodiments.

Referring to FIG. 12, according to embodiments, a WTRU may perform any of the following operations. According to embodiments, as a first operation, a WTRU may receive a physical broadcast channel (PBCH) transmission of a cell, and the PBCH transmission may include information, wherein the information indicates a first control resource set (CORESET) associated with reception of a system information block (SIB). According to embodiments, as a second operation, a WTRU may receive, via the first CORESET, a first physical downlink control channel (PDCCH) transmission including information indicating a first type SIB associated with the first PDCCH transmission, wherein the information indicating the first type SIB may include information indicating a second CORESET that: (1) may be associated with reception of a second type SIB, and (2) may have fewer resource blocks (RBs) than the first CORESET. According to embodiments, as a third operation, a WTRU may receive, via the second CORESET, a second PDCCH transmission including information indicating the second type SIB associated with the second PDCCH transmission.

According to embodiments, there may be a case where any of: (1) the first CORESET may be associated with a first bandwidth part (BWP) of the cell, (2) the second CORESET may be associated with a second BWP of the cell, (3) the second CORESET may have a smaller bandwidth than the first CORESET, (4) the second BWP may have fewer RBs than the first BWP, (5) the second BWP has a smaller bandwidth than the first BWP, (6) the second PDCCH transmission may be associated with the second BWP of the cell, and (7) the second CORESET is associated with the second BWP of the cell.

According to embodiments, there may be a case where any of: (1) a frequency location of the second BWP may be determined according to a frequency location of the first BWP, and (2) the first CORESET and the second CORESET My be both identified as CORESET0. According to embodiments, there may be a case where the first PDCCH transmission includes downlink control information (DCI), and/ or where sets of resources of any of the first PDCCH transmission and the second PDCCH transmission may be determined according to the information included in the PBCH transmission.

According to embodiments, as another operation, a WTRU may determine whether the WTRU may be operating as a regular WTRU or a reduced capacity (RC) WTRU according to a monitoring capability of the WTRU. According to embodiments, the monitoring capability of the WTRU may be determined according to a WTRU type. According to embodiments, there may be a case where the information included in the PBCH transmission may indicate any of: (1) to the regular WTRU, any of: (i) that a CORESET for a Type0-PDCCH-CSS set associated to the SS/PBCH block is not present, and (ii) a channel number of another SS/PBCH block having a CORESET for an associated Type0-PDCCH-CSS; and (2) to the RC WTRU, any of: (i) that a RC CORESET for an associated RC-Type0-PDCCH-CSS is present, and (ii) information indicating one or more monitoring occasions and other parameters of the RC-Type0-PDCCH-CSS and/or the associated RC CORESET0.

According to embodiments, as another operation, a WTRU may determine whether to monitor a first search space associated with a first set of resources associated with the first PDCCH transmission. According to embodiments, for example, a RC WTRU may determine to monitor the first search space according to any of the following conditions: (1) a bandwidth (BW) of the CORESET0 exceeds a threshold; (2) a BW of the CORESET0 summed with a BW of a synchronization signal block (SSB) (e.g., or SS Burst) is above a threshold; (3) [a BW of the CORESET0 summed with a BW of the SSB]-[a BW over which the CORESET0 and the SSB overlap] is above a threshold; (4) a BW from the first subcarrier of the CORESET0 to the last subcarrier of the SSB is above a threshold; (5) a BW from the first subcarrier of the SSB to the last subcarrier of the CORESET0 is above a threshold; (6) a SSB/CORESET0 multiplexing pattern is a specific pattern; (7) a certain time multiplexing technique of CORESET0 and the SSB; (8) a threshold associated with a maximum WTRU BW; (9) a subcarrier spacing (SCS) of the SSB and a downlink control channel (DL CCH) belonging to a predetermined set; (10) a frequency band is one of a set of bands; and (11) the RC WTRU fails to receive the DL CCH in the CORESET0 within a certain time window.

According to embodiments, as another operation, a RC WTRU may determine not to monitor the first search space, receiving, by the RC WTRU, information indicating at least one channel to monitor for any of Type0-PDCCH-CSS and RC-Type0-PDCCH-CSS. According to embodiments, as a first operation, a RC WTRU may determine whether to monitor the first search space according to any of implicit or explicit signaling. According to embodiments, the information included in the PBCH transmission may include a master information block (MIB), the information included in the PBCH transmission may indicate any of one or more monitoring occasions and other parameters of the CORESET0, including any of a certain number of RBs in the CORESET0, a frequency location of the CORESET0, and a number of symbols in the CORESET0. According to embodiments, at least one bit in any of the MIB and the PBCH transmission may indicate, to a RC WTRU, that: a RC CORESET for an associated RC-Type0-PDCCH-CSS is present, and a kSSB is a subcarrier offset value determined according to bits in any of the MIB and a payload of the PBCH transmission.

According to embodiments, there may be a case where any of: the first CORESET may be associated with a regular WTRU, and the second CORESET is associated with a reduced capacity (RC) WTRU, the second CORESET may be multiplexed with any of the first CORESET and a remaining system information (RMSI) PDSCH according to a predetermined pattern known to the RC WTRU, the second CORESET may be transmitted in a portion of the set of resources on OFDM symbols scheduled with the RMSI PDSCH, and the second CORESET may be present on any number of OFDM symbols. According to embodiments, there may be a case where the second CORESET may be associated with a downlink control information (DCI) format for a compact DCI having less bits than the RMSI PDCCH, and the DCI format may indicate a frequency location of the second CORESET. According to embodiments, as another operation, a WTRU may receive second information indicating a second set of resources of the first PDCCH transmission. According to embodiments, there may be a case where any of: the second set of resources may be resources other than a first set of resources associated with the first PDCCH transmission, the second set may be received on condition that a bandwidth (BW) of the first PDCCH transmission exceeds a maximum BW of the WTRU, and the second information includes any number of System Information Blocks (SIBs).

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices including the constraint server and the rendezvous point/server containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs), Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments (e.g., only) and is not intended to be limiting. As used herein, when referred to herein, the terms "user equipment" and its abbreviation "UE" may mean (1) a wireless transmit and/or receive unit (WTRU), such as described infra; (2) any of a number of embodiments of a WTRU, such as described infra; (3) a wireless-capable and/or wired-capable (e.g., tetherable) device configured with, inter alia, some or all structures and functionality of a WTRU, such as described infra; (4) a wireless-capable and/or wired-capable device configured with less than all structures and functionality of a WTRU, such as described infra; or (5) the like. Details of an example WTRU, which may be representative of any WTRU recited herein.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A wireless transmit/receive unit (WTRU) comprising:
a processor and memory, wherein the processor and memory are configured to:
receive a physical broadcast channel (PBCH) transmission that comprises a Master Information Block (MIB), wherein the MIB indicates a first control resource set zero (CORESET #0), ssb-SubcarrierOffset bits, and a first search space zero (SS0) for receiving a first physical downlink control channel (PDCCH) transmission associated with receiving a system information block (SIB);
receive the SIB based on receiving the first PDCCH transmission;
determine a bandwidth part (BWP) associated with reduced capability WTRUs based on the received SIB, wherein the determined BWP is an initial BWP for the reduced capability WTRUS;
determine a second CORESET #0 and a second SS0 based on the received SIB, wherein the second CORESET #0 and the second SS0 are associated with the determined BWP associated with the reduced capability WTRUs; and
on condition that the WTRU is a reduced capability WTRU, receive a second PDCCH transmission in the determined BWP associated with the reduced capability WTRUs using the second CORESET #0 and the second SS0.

2. The WTRU of claim 1, wherein the first CORESET #0 is used for an initial access, and the SIB is SIB1.

3. The WTRU of claim 2, wherein the first SS0 is a common search space (CSS).

4. The WTRU of claim 1, wherein the processor and memory are configured to:
compute an ssb-SubcarrierOffset (kSSB) value from the ssb-SubcarrierOffset bits in the MIB and the PBCH based on a WTRU type, wherein the WTRU type comprises a WTRU capability, a WTRU category, a maximum supportable bandwidth, and a number of antennas, wherein upon determining that the kSSB value is greater than 23, the kSSB value indicates a CORESET for a Type0-PDCCH-CSS set associated to the SS/PBCH block is not present, the kSSB value indicates a channel number of another SS/PBCH block having a CORESET for an associated Type0-PDCCH-CSS, and the WTRU determines monitoring occasions, and
parameters of the Type0-PDCCH-CSS from information in the MIB.

5. The WTRU of claim 1, wherein the first CORESET #0 is determined based on physical resource blocks (PRBs), resource blocks (RBs), control channel elements (CCEs), resource element groups (REGs), or REG bundles.

6. The WTRU of claim 1, wherein the second CORESET #0 comprises a subset of resources of the first CORESET.

7. The WTRU of claim 1, wherein the processor and memory are further configured to determine whether the WTRU is operating as a regular WTRU or a reduced capacity (RC) WTRU according to a monitoring capability of the WTRU.

8. The WTRU of claim 1, wherein at least one monitoring parameter of the second CORESET #0 is based on a monitoring parameter of the first CORESET #0.

9. The WTRU of claim 1, wherein the BWP is associated with a set of frequency resources.

10. A method implemented by a wireless transmit/receive unit (WTRU), the method comprising:
receiving a physical broadcast channel (PBCH) transmission that comprises a Master Information Block (MIB), wherein the MIB indicates a first control resource set zero (CORESET #0), ssb-SubcarrierOffset bits, and a first search space zero (SS0) for receiving a first physical downlink control channel (PDCCH) transmission associated with receiving a system information block (SIB);
receiving the SIB based on receiving the first PDCCH transmission;
determining a bandwidth part (BWP) associated with reduced capability WTRUs based on the received SIB, wherein the determined BWP is an initial BWP for the reduced capability WTRUs;
determining a second CORESET #0 and a second SS0 based on the received SIB, wherein the second CORESET #0 and the second SS0 are associated with the determined BWP associated with the reduced capability WTRUs; and
on condition that the WTRU is a reduced capability WTRU, receiving a second PDCCH transmission in the determined BWP associated with the reduced capability WTRUs using the second CORESET #0 and the second SS0.

11. The method of claim 10, wherein the first CORESET #0 is used for an initial access, and the SIB is SIB1.

12. The method of claim 11, wherein the first SS0 is a common search space (CSS).

13. The method of claim 10, further comprising:
computing an ssb-SubcarrierOffset (kSSB) value from the ssb-SubcarrierOffset bits in the MIB and the PBCH based on a WTRU type, wherein the WTRU type comprises a WTRU capability, a WTRU category, a maximum supportable bandwidth, and a number of antennas,
wherein upon determining that the kSSB value is greater than 23, the kSSB value indicates a CORESET for a Type0-PDCCH-CSS set associated to the SS/PBCH block is not present, the kSSB value indicates a channel number of another SS/PBCH block having a CORESET for an associated Type0-PDCCH-CSS, and the WTRU determines monitoring occasions, and parameters of Type0-PDCCH-CSS from information in the MIB.

14. The method of claim 10, wherein the first CORESET #0 is determined based on physical resource blocks (PRBs), resource blocks (RBs), control channel elements (CCEs), resource element groups (REGs), or REG bundles.

15. The method of claim 10, wherein the second CORESET #0 comprises a subset of resources of the first CORESET.

16. The method of claim 10, wherein the method further comprising determining whether the WTRU is operating as a regular WTRU or a reduced capacity (RC) WTRU according to a monitoring capability of the WTRU.

17. The method of claim 10, wherein at least one monitoring parameter of the second CORESET #0 is based on a monitoring parameter of the first CORESET #0.

18. The method of claim 10, wherein the BWP is associated with a set of frequency resources.

* * * * *